3,352,006
METHOD OF MAKING HOLLOW RING GASKETS
Tatsuo Satoh, Hiratsuka-shi, and Genshichi Hirata, Tokyo, Japan, assignors to The Yokohama Rubber Company, Limited, Tokyo, Japan, a corporation of Japan
Filed June 29, 1965, Ser. No. 467,862
1 Claim. (Cl. 29—512)

The test standards provide that packings or gaskets used in joints for exhaust pipes in automobiles should resist high temperatures and their gas leakage should be below 2000 cc./min. Conventionally gaskets of cast iron or copper have been employed. Sometimes those gaskets contain asbestos. But with those gaskets gas leakage along the surfaces has not been able to be avoided unless the surfaces have been finished highly precisely.

The method of the present invention has several advantages over the conventional ones. In detail, surface finish process is no more necessary for the gaskets; the gaskets are hollow ring shaped, light in weight and suitable for mass production; and the gaskets, which have smooth and arc-shaped surfaces in cross section can keep close contact with the surfaces of the supporting members thereof to thereby reduce gas leakage to several tens of percent of that of the conventional ones.

The object of the present invention is to provide hollow ring gaskets for exhaust pipes which comprise a pair of ring members made of about 1 mm. thick mild steel sheet, each of which comprising a ring portion and a flange portion so that the section may be substantially L-shaped, said pair of ring members being made in such sizes that one of them can be suitably fitted in the other and being pressed together as they are in fitted relation so that the edge of the flange portion of one ring member is bent along the corner of the flange portion of the other ring member, and the butt ends of the ring portions of said ring members being closely jointed in butted relation.

Figure 1:
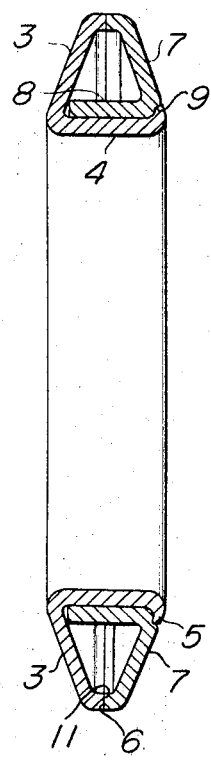
Figure 2:
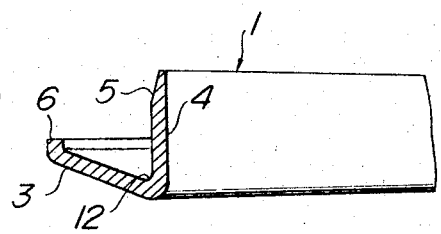
Figure 3:
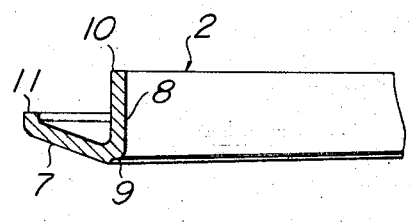

Now, other objects and particularities of the invention will be described with reference to the accompanying drawings, in which:

FIG. 1 is a longitudinal sectional view of a gasket embodying the present invention; and FIGS. 2 and 3 are respectively horizontal sectional views of the members of which the gasket shown in FIG. 1 consists.

As mentioned above, FIG. 1 shows the longitudinal section of a hollow ring gasket which consists of a pair of ring members pressed in a manner that the ring members engage each other. And the sectional views of the ring members are given in FIGS. 2 and 3.

Reference numeral 1 indicates an outer ring member of mild steel sheet pressed into L-shape comprising a ring portion 3 and a flange portion 4. The flange portion 4 has an edge 5, and the ring portion 4 has a butt end 6. An inner ring member 2 made of mild steel sheet, similarly as the outer ring member 1, is pressed into L-shape having a ring portion 7 and a flange portion 8. On the outside edge of the ring member 2 which the ring portion 7 and the flange portion 8 make there is made a groove 9 for the edge 5 of the flange portion 4 of the outer ring member 1 to get in. The flange portion 8 has an edge 10 which is to abut the inside surface 12 of the outer ring member 1 where the ring portion 3 and the flange portion 4 of the same meet, while the ring portion 7 of the inner ring member 2 has a butt end 11 which is to abut the butt end 6 of the outer ring member 1. When the outer and inner ring members engage each other in a manner that the outer ring member 1 holds the inner ring member 2 and cold-pressed together at a pressure of 10,000 kg./cm.$^2$, the edge 5 of the outer ring member 1 gets in the groove 9 of the inner ring member 2, the butt ends 6 and 11 are butted together, and the flange portions 4 and 8 are brought into close contact with each other. Thus, a hollow ring gasket can be obtained. The hollow ring gasket has a section as shown in FIG. 1. Since the outer surfaces of the ring portions 3 and 7 are somewhat arc-shaped and protruding outwardly and smooth, they come into line contact with the surface of a supporting member in a joint for exhaust pipes and the like. Accordingly the gasket gives high sealing effect and requires smaller torque for binding. As a matter of course the high sealing effect prevents gas leakage to a great extent. In addition the gasket receives little vibration because it is light in weight.

The following table shows the results of a test made on the gasket provided by this invention and the conventional machine-worked steel gasket for comparison. The dimensions of the test pieces are: outer diameter 46 mm., inner diameter 30 mm., width (axial) 7.5 mm., and angle between two ring portions 43 degrees.

|  | Pressure, kg./cm.$^2$ | Gas Leakage, cc./min. | Binding Torque, kg.-cm. | Weight, g. |
|---|---|---|---|---|
| Gasket of this invention (press-worked) | 0.3 | 470 | 35 | 23 |
| Conventional gasket | 0.3 | 1,900 | 35 | 37 |

As the test results show, the gasket of this invention admits far less gas leakage as compared with the conventional one. Additionally, even if the axis of a pipe is displaced by 2 degrees or so, the sealing effect can be kept sufficiently high because the sealing surfaces of the gasket or the surfaces indicated by 3 and 7 in the figures are made arc-shaped and protruding outwardly. Its easiness in fitting is also a great advantage.

Furthermore, the gasket of this invention is not subject to deformation at high temperatures. Therefore, it is especially suitable for use, for example, in joints for automobile exhaust pipes which are always heated by exhaust gas. The gasket is further characterized by another advantage, that is, the gasket can keep gas leakage little at high temperatures. In the test mentioned above, gas leakage of the gasket of this invention after 10 hours' exposure to a temperature of 600° C. was as little as 410 cc./min. Being made hollow, the gasket is elastic in binding operation, light and suitable for mass production.

What is claimed is:

A method of manufacturing hollow ring gaskets for exhaust pipes comprising making a pair of ring members each of which comprise an axially extending ring portion and an outwardly extending flange portion, said pair of ring members being made of mild steel sheet, said ring portion of one ring member being insertable over said ring portion of the other ring member, said one ring member having an annular groove on the exterior thereof at the juncture of said flange and ring portions, said flanges on said ring members being inclined toward each other and having abuttable terminal ends, inserting the ring portion on said one ring member over the ring portion of said other ring member until the terminal ends of the inclined flange abut in sealing relationship, and deforming the end of the ring portion of said other ring member outwardly into said annular groove whereby said pair of ring members are secured together to form a hollow ring gasket with smooth sealing surfaces projecting outwardly in arcs.

References Cited

UNITED STATES PATENTS

| | | |
|---|---|---|
| 1,026,423 | 5/1912 | Andrews. |
| 1,875,148 | 8/1932 | Reid _____ 277—226 |
| 1,917,175 | 7/1933 | Wills et al. _____ 277—226 |
| 2,859,061 | 11/1958 | Reid. |
| 3,223,062 | 12/1965 | Mulder. |
| 3,090,109 | 5/1963 | White et al. |

CHARLIE T. MOON, *Primary Examiner.*